US012546596B2

(12) United States Patent
Lyttle

(10) Patent No.: US 12,546,596 B2
(45) Date of Patent: Feb. 10, 2026

(54) ALIGNMENT BUMPER FOR SURVEYING PRISM

(71) Applicant: Trimble Inc., Westminster, CO (US)

(72) Inventor: Scott Lyttle, Westminster, CO (US)

(73) Assignee: Trimble Inc., Westminster, CO (US)

( * ) Notice: Subject to any disclaimer, the term of this patent is extended or adjusted under 35 U.S.C. 154(b) by 327 days.

(21) Appl. No.: 18/525,200

(22) Filed: Nov. 30, 2023

(65) Prior Publication Data

US 2025/0180354 A1    Jun. 5, 2025

(51) Int. Cl.
*G01C 15/00*  (2006.01)
*G01C 25/00*  (2006.01)
*G02B 5/04*   (2006.01)

(52) U.S. Cl.
CPC ............. *G01C 15/00* (2013.01); *G01C 25/00* (2013.01); *G02B 5/04* (2013.01)

(58) Field of Classification Search
CPC ........ G01C 15/002; G01C 15/06; G02B 5/04; G02B 5/12; G02B 5/122
USPC .................................................. 359/834, 529
See application file for complete search history.

(56) References Cited

U.S. PATENT DOCUMENTS

2023/0102020 A1*  3/2023  Hinderling ......... G02B 27/0006
                                                                  359/509

FOREIGN PATENT DOCUMENTS

JP          5142272 B2      2/2013

OTHER PUBLICATIONS

Extended European Search Report for Application No. 24214678. 5-1009, mailed Mar. 11, 2025, 9 pages.

* cited by examiner

*Primary Examiner* — Angela M. Medich
(74) *Attorney, Agent, or Firm* — Kilpatrick Townsend & Stockton LLP

(57)  ABSTRACT

A surveying prism can include a housing, optical features, and a bumper. The optical features can be located on a radial surface of the housing azimuthally offset from one another by equal arcs. The bumper can cover the optical features. The bumper can include flat edges and position indicators. The flat edges can correspond to the optical features. Each flat edge can have a different first center point of first center points that is approximately at the same azimuthal angle with respect to the surveying prism as a corresponding second center point of a corresponding optical feature of the optical features. The position indicators can correspond to the optical features, and each position indicator can be positioned at a central point of a different flat edge of the flat edges.

20 Claims, 5 Drawing Sheets

ALIGNMENT BUMPER FOR SURVEYING PRISM

BACKGROUND

This disclosure relates in general to surveying systems. Surveying determines positions of points relative to each other and/or to the Earth. Surveying can be used in many applications, for example, by land surveyors, construction professionals, and civil engineers. Surveying often uses specialized and/or expensive equipment, such as laser levels, surveying rods or prisms, total stations, laser scanners, and GNSS (Global Navigation Satellite System) receivers. Aligning the specialized and/or expensive equipment to ensure precise measurements can be difficult.

SUMMARY

This disclosure relates to surveying, and without limitation to an alignment bumper for a surveying prism. The surveying prism can include a housing, a set of optical features, and the alignment bumper. The housing can define at least a first end and a second end. The optical features can be located on a radial surface of the housing azimuthally offset from one another by equal arcs. The alignment bumper can be located on the first end of the housing and can cover the set of optical features. The alignment bumper can include a set of flat edges and a set of position indicators. The set of flat edges can be located on a radial surface of the alignment bumper, and the set of flat edges can correspond to the set of optical features. Each flat edge of the set of flat edges can have a different first center point of a set of first center points that is approximately at the same azimuthal angle with respect to the surveying prism as a corresponding second center point, included in a set of second center points of the set of optical features, of a corresponding optical feature of the set of optical features. The set of position indicators can correspond to the set of optical features. Each position indicator of the set of position indicators can be positioned at a central point of a different flat edge of the set of flat edges.

In some embodiments, the set of flat edges can have a number of flat edges that is evenly divisible by four.

In some embodiments, the set of optical features can include eight optical features, and each optical feature of the eight optical features can be azimuthally offset from an adjacent optical feature of the eight optical features by approximately 45°.

In some embodiments, the set of optical features can have a first number of optical features, the set of flat edges can have a second number of flat edges, the set of position indicators can have a third number of position indicators, and the first number, the second number, and the third number can be the same.

In some embodiments, the alignment bumper can have approximately a circular shape, and each flat edge of the set of flat edges can be a chord that extends from a first point on a radius of the circular shape to a second point on the radius of the circular shape.

In some embodiments, each first center point of the set of first center points can be longitudinally offset from a corresponding second center point of the set of second center points along a longitudinal axis of the surveying prism.

In some embodiments, the set of optical features can include one or more mirrors or lenses that can be configured to reflect emitted light from a total station to facilitate precise measurements of location.

In some embodiments, the set of flat edges can include an even number of edges, the set of flat edges can include at least one pair of flat edges having a first flat edge and a second flat edge, and the first flat edge can be azimuthally offset from the second flat edge by approximately 180°.

In certain embodiments, a system can include a total station and a surveying prism. The total station can be configured to be used for at least one surveying operation. The surveying prism can be configured to be used for the at least one surveying operation, and the surveying prism can include a housing, a set of optical features, and an alignment bumper. The housing can define at least a first end and a second end. The set of optical features can be located on a radial surface of the housing azimuthally offset from one another by equal arcs. The alignment bumper can be located on the first end of the housing and can cover the set of optical features. The alignment bumper can include a set of flat edges and a set of position indicators. The set of flat edges can be located on a radial surface of the alignment bumper, and the set of flat edges can correspond to the set of optical features. Each flat edge of the set of flat edges can have a different first center point of a set of first center points that can approximately be at the same azimuthal angle with respect to the surveying prism as a corresponding second center point, included in a set of second center points of the set of optical features, of a corresponding optical feature of the set of optical features. The set of position indicators can correspond to the set of optical features. Each position indicator of the set of position indicators can be positioned at a central point of a different flat edge of the set of flat edges.

In certain embodiments, a method can involve using a surveying prism having an alignment bumper. The method can include positioning the surveying prism at a first location. The surveying prism can include a housing, a set of optical features, and the alignment bumper. The housing can define at least a first end and a second end. The set of optical features can be located on a radial surface of the housing azimuthally offset from one another by equal arcs. The alignment bumper can be located on the first end of the housing and can cover the set of optical features. The alignment bumper can include a set of flat edges and a set of position indicators. The set of flat edges can be located on a radial surface of the alignment bumper, and the set of flat edges can correspond to the set of optical features. Each flat edge of the set of flat edges can have a different first center point of a set of first center points that can approximately be at the same azimuthal angle with respect to the surveying prism as a corresponding second center point, included in a set of second center points of the set of optical features, of a corresponding optical feature of the set of optical features. The set of position indicators can correspond to the set of optical features. Each position indicator of the set of position indicators can be positioned at a central point of a different flat edge of the set of flat edges. Additionally or alternatively, at least one flat edge of the set of flat edges can be positioned against a surface. The method can include positioning a total station offset from the surveying prism. The method can include recording surveying data using the total station and the surveying prism.

Further areas of applicability of the present disclosure will become apparent from the detailed description provided hereinafter. It should be understood that the detailed description and specific examples, while indicating various embodi-

BRIEF DESCRIPTION OF THE DRAWINGS

The present disclosure is described in conjunction with the appended figures.

Figure 1:
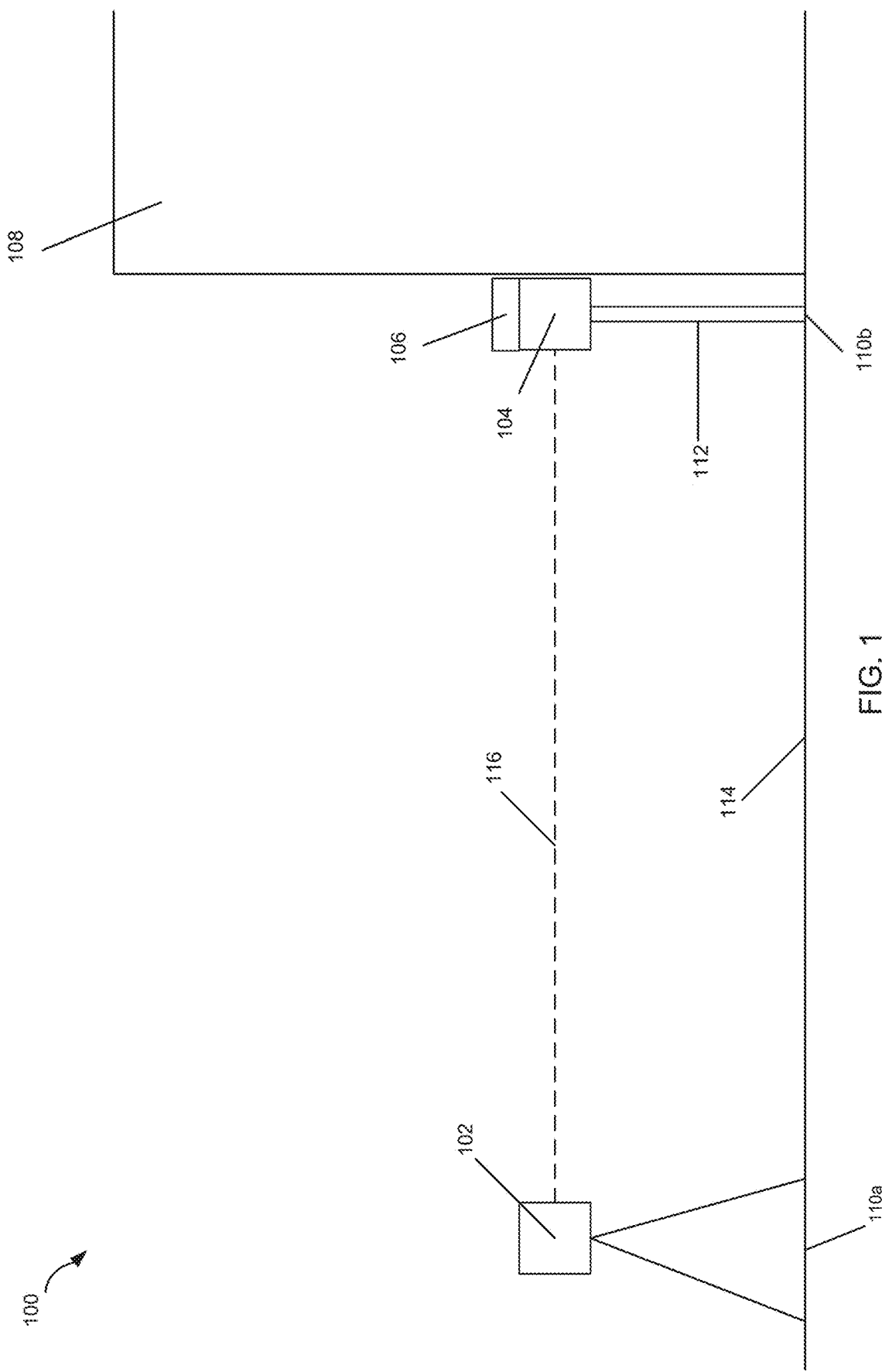
FIG. 1 depicts an embodiment of a surveying system that includes a total station and a surveying prism that can include an alignment bumper according to certain aspects of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing an exemplary embodiment. It is understood that various changes may be made in the function and arrangement of elements without departing from the spirit and scope as set forth in the appended claims.

This disclosure, without limitation, relates to a surveying prism that can include an alignment bumper and that can be used, for example, in a surveying system, at least to make precise location measurements. The precise location measurements can include position measurements of buildings or items located therein, can include relative or absolute locations of survey markers or boundaries, for example of property lines or the like, can include any other suitable type of location measurement that can be made with the surveying system, or any combination thereof. The surveying system can include a total station, the surveying prism, and other suitable components or devices for the surveying system. In some examples, the surveying prism may be positioned offset, such as horizontally offset, vertically offset, diagonally offset, or a combination thereof, from the total station. The surveying prism, or a set of optical features included therein, may be arranged to reflect light, such as infrared light or other light originating from the total station, to facilitate the precise location measurements.

In some examples, the alignment bumper can include a set of flat edges and/or a set of position indicators. The set of flat edges can include one or more flat edges that may be distributed, such as equally, about a central point, and on one or more external surfaces (e.g., a radial surface), of the alignment bumper. In a particular example, the set of flat edges can include eight flat edges, which each may have the same or similar length, distributed equally about the central point. The set of flat edges can correspond to a set of optical features positioned in the surveying prism. The set of optical features may include one or more optical features, such as mirrors, lenses, or other reflective or refractive materials, that may be configured to reflect light and/or to refract light. The set of optical features may include the same number of optical features as a number of flat edges included in the set of flat edges. For example, if the set of flat edges includes eight flat edges, the set of optical features may include eight optical features. Each flat edge may have a first center point that may be at least approximately aligned with a second center point of a corresponding optical feature. For example, the first center point may be at the same or similar azimuthal angle with respect to the alignment bumper as the second center point.

The set of position indicators may be positioned on the alignment bumper and may be distributed about the central point of the alignment bumper. In some examples, the set of position indicators may include one or more position indicators. In a particular example, the set of position indicators may include eight position indicators, though other suitable numbers (e.g., less than eight or more than eight) of position indicators are possible to include in the set of position indicators. Additionally or alternatively, the set of position indicators may correspond to the optical features and/or the set of flat edges. For example, the set of position indicators may include the same or similar number of position indicators as a number of flat edges included in the set of flat edges or as a number of optical features included in the set of optical features. In a particular example, if the set of optical features includes eight optical features, and/or if the set of flat edges includes eight flat edges, then the set of position indicators may include eight position indicators. In some examples, each position indicator of the set of position indicators may be positioned on a top surface of the alignment bumper and proximate to a corresponding flat edge of the set of flat edges. Additionally or alternatively, each position indicator of the set of position indicators may be positioned on a central point or a central axis of a corresponding flat edge of the set of flat edges. The set of position indicators may include one or more different types of position indicators such as a blade, an inverted blade, and the like.

Application examples of the surveying prism can include the following non-limiting examples:

While surveying a property, the surveying prism can be positioned at one or more corners or edges or the property to facilitate precise location measurements of the property via a total station. In examples in which the one or more corners or edges abuts a wall or other obstacle, the alignment bumper of the surveying prism can be positioned adjacent to the wall or other obstacle to properly align the surveying prism with the total station.

While surveying a building, the surveying prism can be positioned against one or more walls or other solid surfaces of the building. The set of flat edges may allow the surveying prism to provide a known and precise offset with respect to the wall or other solid surface to facilitate precise measurements of the building.

Surveying prisms, such as 360° surveying prisms, may inherently have variations in accuracy, such as horizontally and/or vertically, as they are rotated throughout the 360°.

The variation, which may be or include a "wobble," can occur when there are varied return signals coming back from a reflective surface of the surveying prism. The surveying prism disclosed herein may have precise locations on the surveying prism as it is rotated through the 360° that can correspond with one or more, such as eight, predefined and precise orientations. These precise locations of the surveying prism can be precisely aligned with position indicators positioned on the alignment bumper. In some examples, this precise alignment can be used by a user of the surveying prism to take an important observation that may involve a high level of precision.

Referring first to FIG. 1, an embodiment of a surveying system 100 that includes a total station 102 and a surveying prism 104 that can include an alignment bumper 106 is illustrated according to certain aspects of the present disclosure. The surveying system 100 can be used to make precise measurements, for example of a building 108, of a property, and/or of any other suitable object, location, or the like. The total station 102 may be positioned offset from the surveying prism 104. For example, the total station 102 may be positioned at a first location 110a that is horizontally offset from a second location 110b at which the surveying prism 104 can be positioned. In other examples, the total station 102 may be otherwise suitably offset (e.g., vertically, diagonally, combinations thereof, etc.) from the surveying prism 104. The alignment bumper 106 may be positioned on a top surface of the surveying prism 104, although the alignment bumper 106 may also be positioned in other suitable locations (e.g., on a bottom surface, on a middle surface, etc.) on the surveying prism 104.

In some examples, the surveying prism 104 can be positioned adjacent to the building 108, though in other examples, the surveying prism 104 can be positioned adjacent to other objects, or to nothing at all. The surveying prism 104 can be positioned abutting or otherwise contacting a wall of the building 108 such that at least one flat edge of the alignment bumper 106 is physically contacting the wall of the building 108. For example, the surveying prism 104 can be rotated such that a first flat edge of a set of flat edges included on a radial edge of the alignment bumper 106 is approximately parallel to the wall of the building 108, and the surveying prism 104 can be displaced such that the first flat edge abuts the wall while the surveying prism 104 is approximately vertical. For example, a rod 112 of the surveying prism 104 can be approximately aligned with a gravity vector or perpendicular with respect to a ground surface 114 on which the surveying prism 104 is positioned.

The total station 102 may be offset from the surveying prism 104 to make one or more precise measurements about a property, about the building 108, or relating to other suitable surveying subjects, surveying markers, or targets. The total station 102 may be aligned with one or more optical features of the surveying prism 104. For example, the total station 102 may be configured to transmit a light signal 116 to the surveying prism 104. The light signal 116 may be or include infrared light, laser light, or other suitable types of light. The light signal 116 may be received and/or reflected by the one or more optical features of the surveying prism 104. The received and/or reflected light may be used, for example, by the surveying system 100 to make precise measurements with respect to the building 108 or other suitable surveying targets. The precise measurements can be made with data including a known and precise horizontal offset from the building 108 provided by the surveying prism 104 due to the alignment bumper 106.

Figure 2:
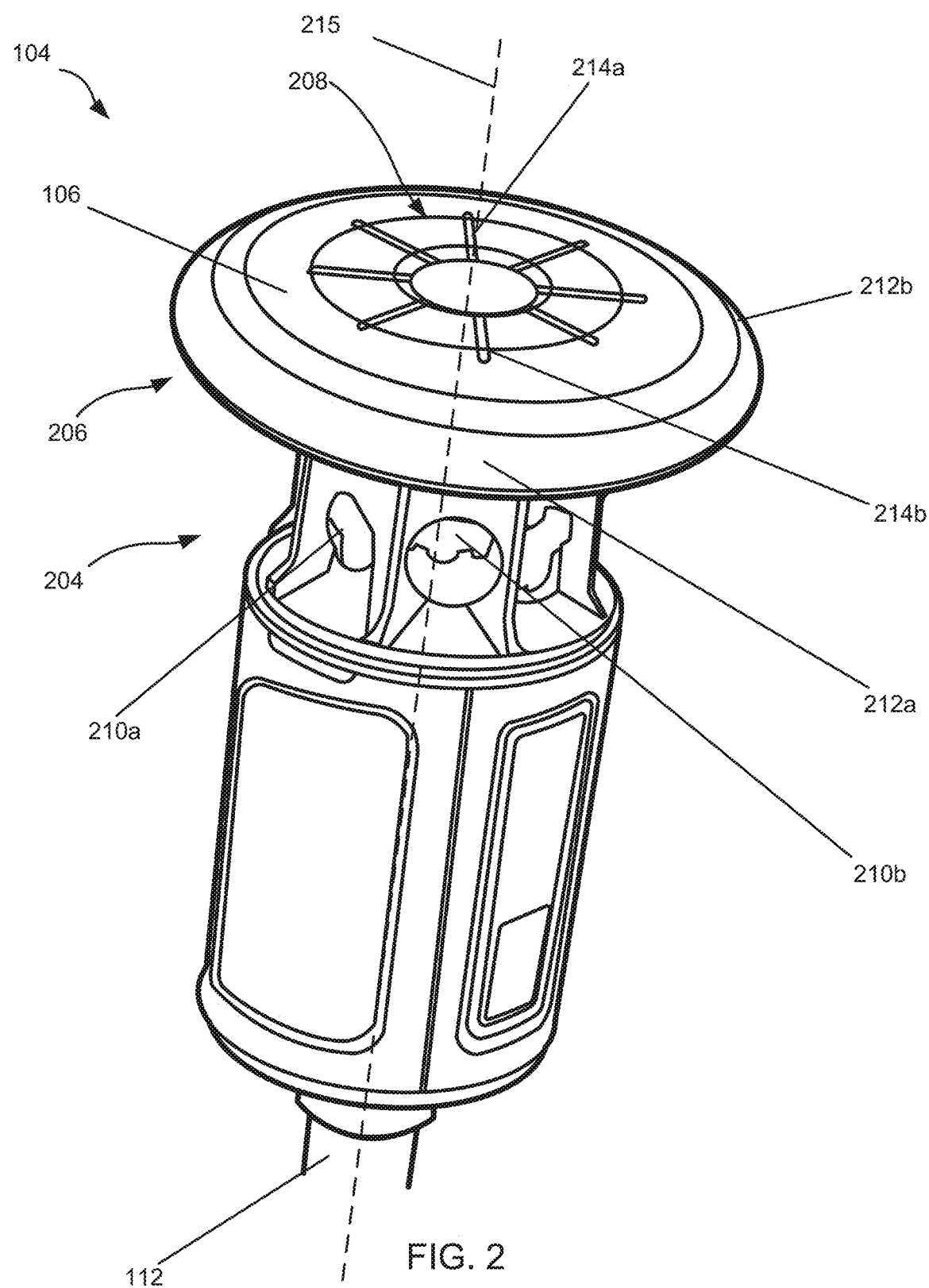
FIG. 2 depicts an embodiment of a surveying prism that can include an alignment bumper according to certain aspects of the present disclosure.

FIG. 2 depicts an embodiment of a surveying prism 104 that can include an alignment bumper 106 according to certain aspects of the present disclosure. The surveying prism 104 can include (i) the alignment bumper 106, which may be positioned on a top portion 202 of the surveying prism 104, (ii) a set of optical features 204, (iii) a set of flat edges 206, (iv) a set of position indicators 208, and any other suitable components for the surveying prism 104. The set of optical features 204 may include one or more optical features such as a first optical feature 210a and a second optical feature 210b. In a particular example, the set of optical features 204 may include eight optical features, though other suitable numbers (e.g., less than eight or more than eight, numbers divisible by two, numbers divisible by four, and the like) of optical features are possible to include in the set of optical features 204. The set of flat edges 206 may include one or more flat edges such as a first flat edge 212a and a second flat edge 212b. In a particular example, the set of flat edges 206 may include eight flat edges, though other suitable numbers (e.g., less than eight or more than eight, numbers divisible by two, numbers divisible by four, and the like) of flat edges are possible to include in the set of flat edges 206. Additionally or alternatively, the set of flat edges 206 may include a first number of flat edges that is the same as, or similar to, a second number of optical features included in the set of optical features 204. The set of position indicators 208 may include one or more position indicators such as a first position indicator 214a and a second position indicator 214b. In a particular example, the set of position indicators 208 may include eight position indicators, though other suitable numbers (e.g., less than eight or more than eight, numbers divisible by two, numbers divisible by four, and the like) of position indicators are possible to include in the set of position indicators 208. Additionally or alternatively, the set of position indicators 208 may include a third number of position indicators that is the same as, or similar to, the second number of optical features included in the set of optical features 204 and/or the first number of flat edges included in the set of flat edges 206.

In some examples, the set of flat edges 206 may correspond to the set of optical features 204. Corresponding may involve being at least approximately aligned, may involve being at least approximately at the same or similar angular (e.g., azimuthal) position, or the like. For example, the first flat edge 212a may correspond to the second optical feature 210b since the first flat edge 212a may be located at a first azimuthal angle with respect to a vertical, central axis 215 of the surveying prism 104 that is approximately the same as a second azimuthal angle with respect to the vertical, central axis 215 of the surveying prism 104 at which the second optical feature 210b is located. Additionally or alternatively, the set of position indicators 208 may correspond to the set of flat edges 206 and/or the set of optical features 204. For example, the second position indicator 214b may correspond to the first flat edge 212a and/or the second optical feature 210b since the second position indicator 214b may be located at a third azimuthal angle with respect to the vertical, central axis 215 of the surveying prism 104 that is approximately the same as the second azimuthal angle of the second optical feature 210b and/or the same as the first azimuthal angle of the first flat edge 212a.

In some examples, the set of position indicators 208 may be positioned on a top surface of the alignment bumper 106. Additionally or alternatively, the set of flat edges 206 may be positioned on a radial surface of the alignment bumper 106. The set of flat edges 206 may be evenly distributed or otherwise arranged around the radial surface of the alignment bumper 106. For example, the set of flat edges 206 may be equally distributed around the radial surface, such as about the vertical, central axis 215. In a particular example in which there are eight flat edges included in the set of flat edges 206, each flat edge of the set of flat edges 206 may be offset from an adjacent flat edge (e.g., in either direction) by approximately 45°. Each position indicator of the set of position indicators 208 can be located above a corresponding flat edge of the set of flat edges 206 and/or above a corresponding optical feature of the set of optical features 204. In a particular example, such as the example illustrated by FIG. 2, the second position indicator 214b can be positioned above the first flat edge 212a, which can be positioned above the second optical feature 210b.

Figure 3:
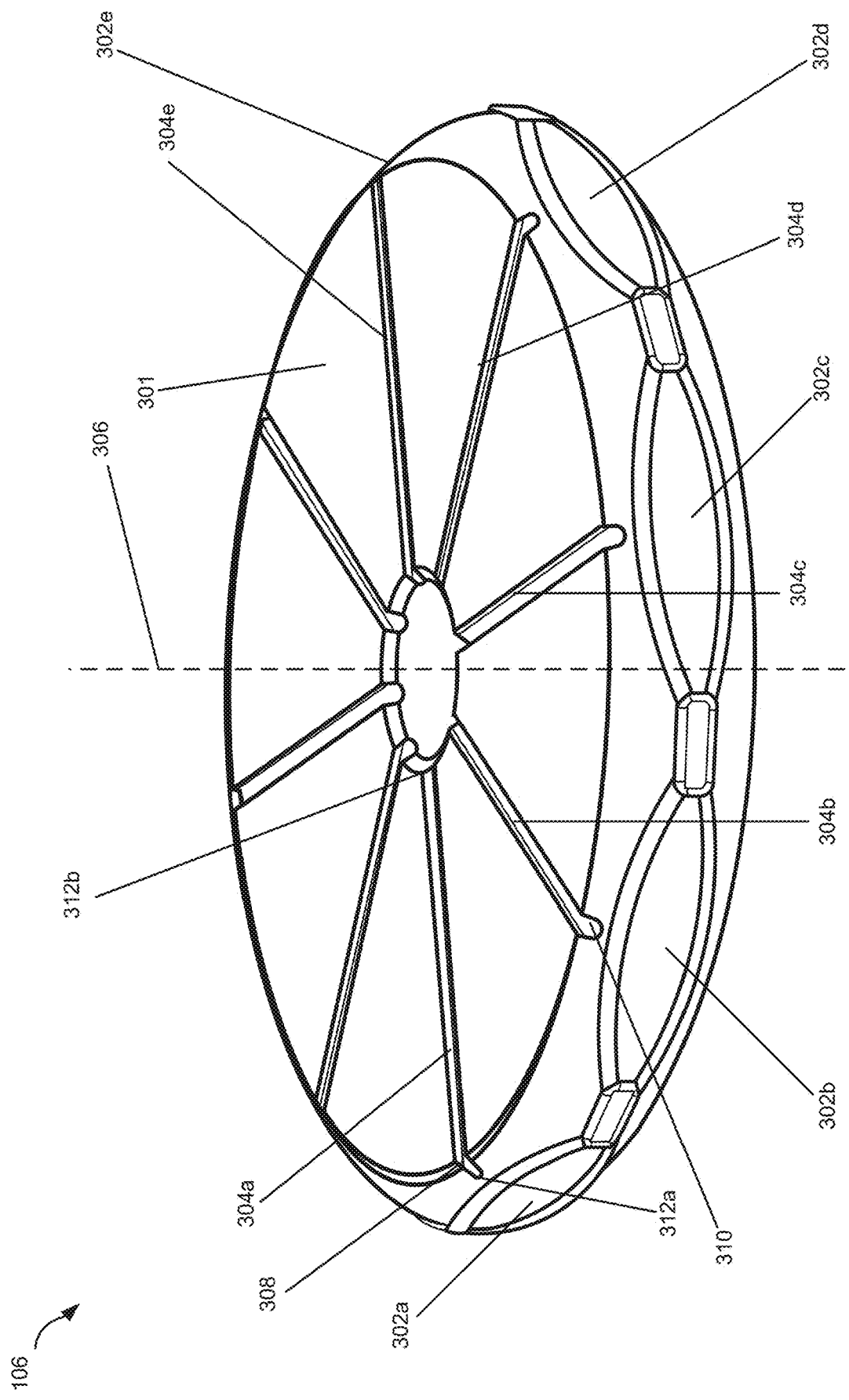
FIG. 3 depicts an embodiment of an alignment bumper according to certain aspects of the present disclosure.

FIG. 3 depicts an embodiment of an alignment bumper 106 according to certain aspects of the present disclosure. The alignment bumper 106 may be sized, shaped, or otherwise arranged to be positioned on a top surface of a surveying prism 104. For example, the alignment bumper 106 may have a diameter 301 that may be approximately similar to or slightly larger than a diameter of the top surface of the surveying prism 104. In a particular example, the alignment bumper 106 may be configured to be attached to the surveying prism 104 in a single configuration that causes the alignment bumper 106, or any component thereof, to be precisely aligned with the surveying prism 104 or any component thereof.

As illustrated in FIG. 3, the alignment bumper 106 can include a set of flat edges, which may include a first flat edge 302a, a second flat edge 302b, a third flat edge 302c, a fourth flat edge 302d, and a fifth flat edge 302e, and the alignment bumper 106 can include a set of position indicators, which may include a first position indicator 304a, a second position indicator 304b, a third position indicator 304c, a fourth position indicator 304d, and a fifth position indicator 304e. The alignment bumper 106 may include additional or alternative numbers of flat edges and/or position indicators, and the alignment bumper 106 may include other suitable components other than the flat edges and the position indicators. The set of flat edges and/or the set of position indicators may be distributed around or otherwise arranged about a central axis 306 of the alignment bumper 106.

In some examples, the set of position indicators may correspond azimuthally to the set of flat edges. As illustrated in FIG. 3, the first position indicator 304a corresponds to the first flat edge 302a, the second position indicator 304b corresponds to the second flat edge 302b, the third position indicator 304c corresponds to the third flat edge 302c, the fourth position indicator 304d corresponds to the fourth flat edge 302d, and the fifth position indicator 304e corresponds to the fifth flat edge 302e. In other examples, the set of position indicators may otherwise suitably correspond to the set of flat edges. Corresponding in the foregoing example may involve a particular position indicator being positioned on top of, and in the center of, a corresponding flat edge. As illustrated in FIG. 3, the first position indicator 304a is located on a top portion 308 of the first flat edge 302a, the second position indicator 304b is located on a top portion 310 of the second flat edge 302b, and so on. The set of position indicators may be located with respect to the set of flat edges to indicate, for example to a user of the surveying prism 104, an alignment of the surveying prism 104 or optical features thereof. For example, a particular position indicator, such as the first position indicator 304a, may be positioned in at a central point, such as the top portion 308, of a particular flat edge, such as the first flat edge 302a, to indicate to an observer that the surveying prism 104 is aligned via a corresponding optical feature. Each position indicator of the set of position indicators, or any subset thereof, can extend from a corresponding first point on the alignment bumper 106 to a corresponding second point on the alignment bumper 106. For example, the first position indicator 304a can extend from a first point 312a, for example, proximate to an external radius of the alignment bumper 106, to a second point 312b, which may me located proximate to a central point of the alignment bumper 106. In other examples, the set of position indicators, or any subset thereof, may include shorter position indicators, longer position indicators, or the like. Additionally or alternatively, while the set of position indicators are illustrated in FIG. 3 as being inverted, the set of position indicators, or any subset thereof, may be or include blade-type position indicators that may extend above the alignment bumper 106.

As illustrated in FIG. 3, the alignment bumper 106 may have approximately a circular shape. For example, the external surface may include one or more arcs having the same or similar radius as one another. Additionally or alternatively, each flat edge of the set of flat edges, or any subset thereof, may extend, for example as a chord, from a first end of a first arc to a first end of an adjacent arc. In other example, each flat edge of the set of flat edges, or any subset thereof, may extend from a first end of a first adjacent flat edge of the set of flat edges to a second end of a second adjacent flat edge of the set of flat edges. In the foregoing example, the alignment bumper 106 may have approximately a polygonal shape such as a triangle, a square or rectangle, a hexagon, an octagon, and so on.

Figure 4:
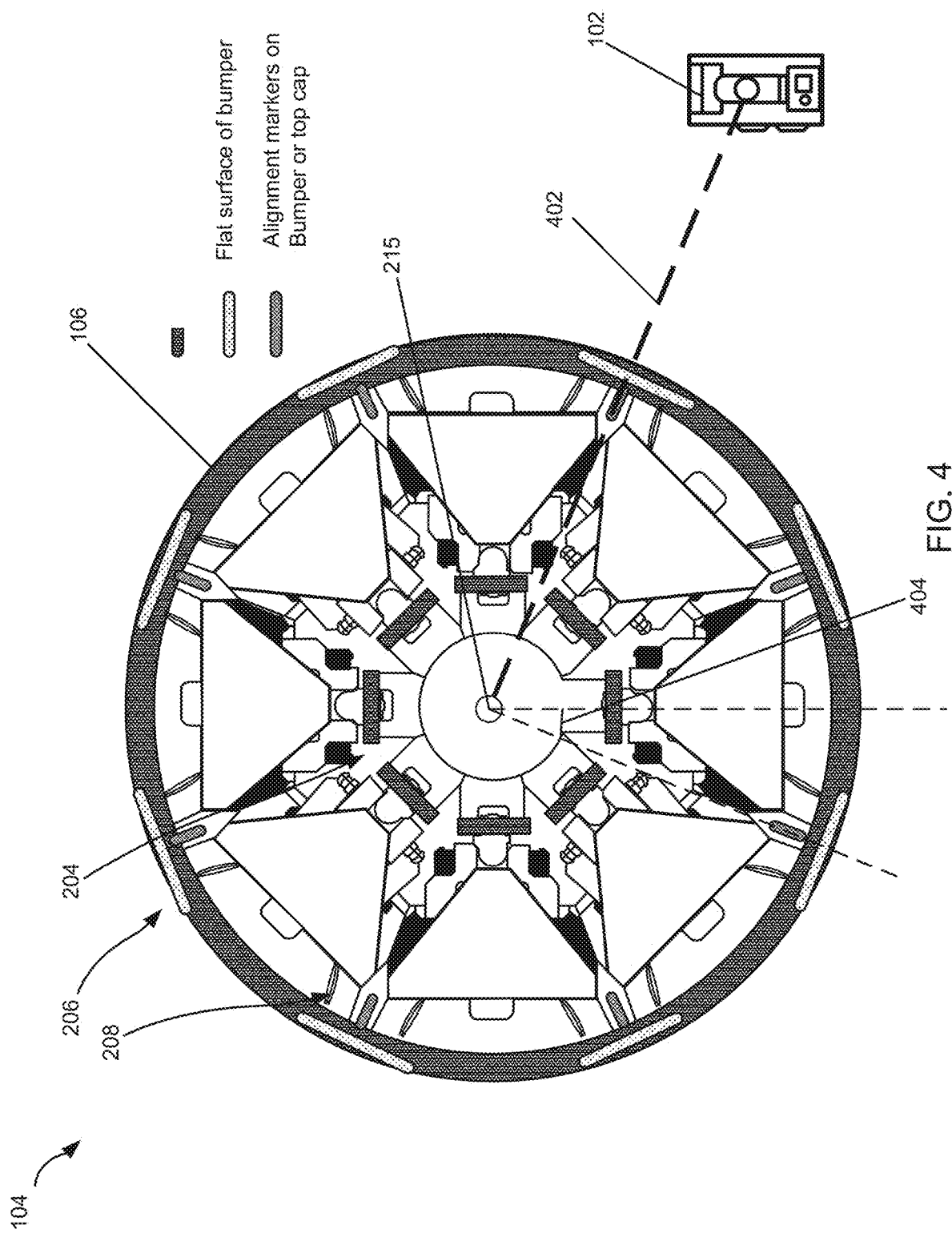
FIG. 4 depicts a sectional top-view of an embodiment of a surveying prism that can include an alignment bumper according to certain aspects of the present disclosure.

FIG. 4 depicts a sectional top-view of an embodiment of a surveying prism 104 that can include an alignment bumper 106 according to certain aspects of the present disclosure. As illustrated in FIG. 4, the surveying prism 104 can include the set of optical features 204, the set of flat edges 206, the set of position indicators 208, and any other suitable components for the surveying prism 104. The set of optical features 204 may be positioned within the surveying prism 104 and may be configured to receive and/or reflect and/or refract a received light signal 402 from a total station 102. For example, the set of optical features 204 may be positioned within the surveying prism 104 and arranged, for example symmetrically, about a vertical, central axis 215 of the surveying prism 104.

In some examples, the set of flat edges 206 may be located on a radial surface, such as an outer diameter, of the alignment bumper 106. Each flat edge of the set of flat edges 206 may be positioned at a different location, and equally spaced about the vertical, central axis 215, of the surveying prism 104. Each flat edge of the set of flat edges 206 may correspond to a different optical feature of the set of optical features 204. For example, a particular flat edge of the set of flat edges 206 may be located at a first azimuthal angle 404, and a corresponding optical feature may also be located at the first azimuthal angle 404. In some additional examples, the set of position indicators 208 may be positioned proximate to, on top of, or otherwise suitably with respect to the set of flat edges 206 and/or the set of optical features 204. As illustrated in FIG. 4, each position indicator of the set of position indicators 208 are positioned at a central point of a corresponding flat edge of the set of flat edges 206, though the set of position indicators 208, or any subset thereof, may be located in other suitable locations with respect to the surveying prism 104. In some examples, the set of position indicators 208 may be positioned to visually indicate, to physically (e.g., via tactile interaction) indicate, or the like an alignment of the set of optical features 204 with respect to the total station 102. For example, a user of the surveying prism 104 can inspect the set of position indicators 208 and can determine that a particular optical feature that corresponds to an inspected position indicator may be precisely aligned with the total station 102 and that the surveying prism 104 is ready to be used with the total station 102 to make precise location measurements.

Figure 5:
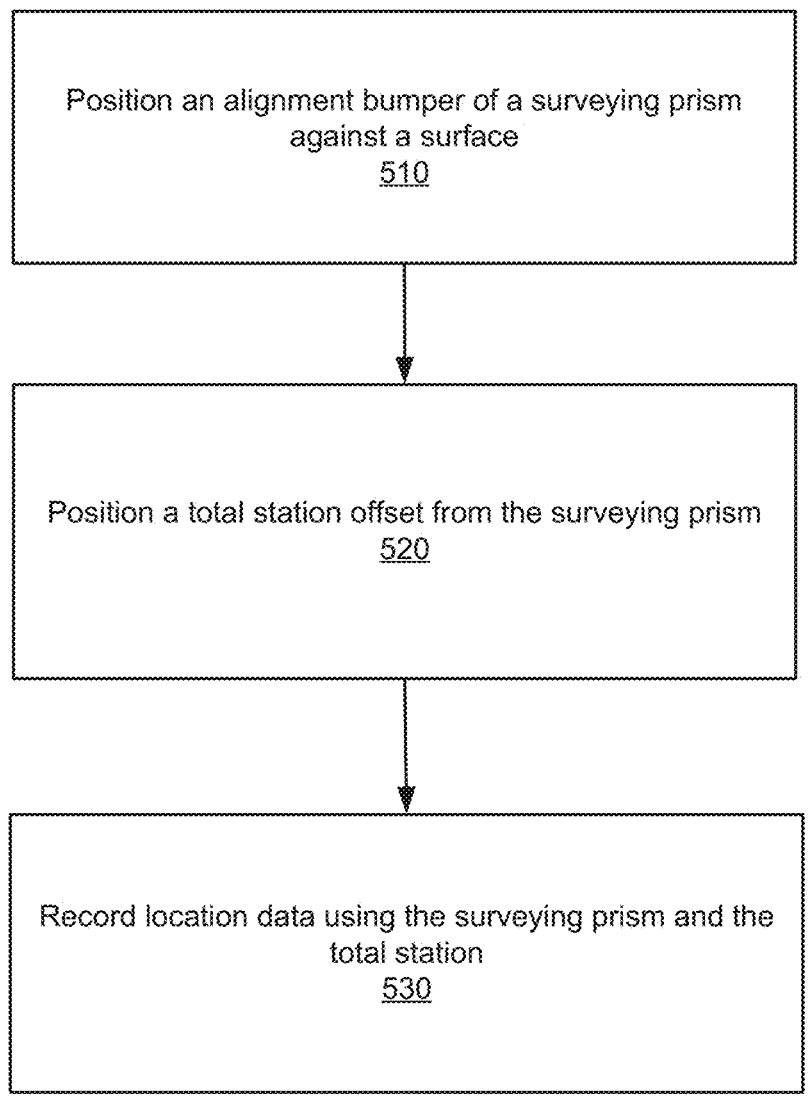
FIG. 5 illustrates a flowchart of an embodiment of a process for using a surveying prism that can include an alignment bumper according to certain aspects of the present disclosure.

In FIG. 5, a flowchart of an embodiment of a process 500 for using a surveying prism 104 that can include an alignment bumper 106 according to certain aspects of the present disclosure is provided. In some examples, the surveying prism 104 can be used with the total station 102 to at least make precise location measurements, for example with respect to a building, a survey marker, real property, and the like.

Positioning an Alignment Bumper of the Surveying Prism

Process 500 can begin at block 510 with positioning an alignment bumper, such as the alignment bumper 106, against a surface. The surface may be or include a wall of a building, a surface of a real property, or any other suitable solid surface against which the alignment bumper can be positioned. Positioning the alignment bumper can involve positioning a first flat edge of a set of flat edges included in the alignment bumper to physically contact the surface. In some examples, when the alignment bumper is positioned against the surface, the first flat edge may be approximately parallel to the surface. Additionally or alternatively, the surveying prism may be positioned approximately parallel to a gravity vector or perpendicular with respect to a floor (e.g., which may be the ground) on which the surveying prism is disposed. In other examples, the surveying prism, or any component (e.g., the rod 112) thereof, may be at an acute angle, a reflex angle, an obtuse angle, parallel, or the like with respect to the gravity vector and/or floor. In some examples, when the surveying prism is positioned against the surface, at least one optical feature may be precisely aligned with a potential light signal of the total station. For example, a line normal to the at least at least one optical feature may be parallel and overlapping with respect to a trajectory of the potential light signal of the total station.

Positioning the Total Station Offset from the Surveying Prism

At block 520, the total station is positioned offset from the surveying prism and may be aligned with a target or other survey marker. The total station can be positioned horizontally offset from the surveying prism, vertically offset from the surveying prism, and/or diagonally offset from the surveying prism. The total station can be aligned with at least one optical feature of the surveying prism. For example, the total station can transmit a light signal toward the surveying prism and can receive a reflected light signal from the surveying prism.

Recording Precise Location Data Using the Total Station and the Surveying Prism At block 530, the total station and the surveying prism can be used to make precise measurements of a surveying target, such as a point on or near a building, a real property, and the like that may be included in or adjacent to the surface against which the surveying prism can be positioned. The total station can generate a light signal, for example via a laser light source, an infrared light source, or the like, and the total station can transmit the laser light toward the surveying prism. The surveying prism can be sufficiently aligned with the total station to reflect the light signal back toward the total station, which can receive the reflected light signal. The total station can record data based on the reflected light signal that is received, and the data can be used to make precise location measurements about a location of the surveying prism. For example, the data can be used along with a known and precise offset with respect to the surveying prism to make the precise location measurements. The offset may be caused by a center of the surveying prism being offset by at least a small distance from the surface. But, the alignment bumper can allow the offset to be defined, or otherwise known, and precise such that the precise location measurements can be made.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A surveying prism comprising:
   a housing defining at least a first end and a second end;
   a plurality of optical features located on a radial surface of the housing azimuthally offset from one another by equal arcs; and
   a bumper located on the first end of the housing and covering the plurality of optical features, wherein the bumper comprises:
      a plurality of flat edges located on a radial surface of the bumper, the plurality of flat edges corresponding to the plurality of optical features, wherein each flat edge of the plurality of flat edges has a different first center point of a plurality of first center points that is approximately at the same azimuthal angle with respect to the surveying prism as a corresponding second center point, included in a plurality of second center points of the plurality of optical features, of a corresponding optical feature of the plurality of optical features; and
      a plurality of position indicators corresponding to the plurality of optical features, wherein each position indicator of the plurality of position indicators is positioned at a central point of a different flat edge of the plurality of flat edges.

2. The surveying prism of claim 1, wherein the plurality of flat edges has a number of flat edges that is evenly divisible by four.

3. The surveying prism of claim 2, wherein the plurality of optical features comprises eight optical features, wherein each optical feature of the eight optical features is azimuthally offset from an adjacent optical feature of the eight optical features by approximately 45°.

4. The surveying prism of claim 1, wherein the plurality of optical features has a first number of optical features, wherein the plurality of flat edges has a second number of flat edges, wherein the plurality of position indicators has a third number of position indicators, and wherein the first number, the second number, and the third number are the same.

5. The surveying prism of claim 1, wherein the bumper has an approximately circular shape, and wherein each flat edge of the plurality of flat edges is a chord that extends from a first point on a radius of the circular shape to a second point on the radius of the circular shape.

6. The surveying prism of claim 1, wherein each first center point of the plurality of first center points is longitudinally offset from a corresponding second center point of the plurality of second center points along a longitudinal axis of the surveying prism.

7. The surveying prism of claim 1, wherein the plurality of optical features comprises one or more mirrors or lenses that are configured to reflect emitted light from a total station to facilitate precise measurements of location.

8. The surveying prism of claim 1, wherein the plurality of flat edges comprises an even number of edges, wherein the plurality of flat edges comprises at least one pair of flat edges having a first flat edge and a second flat edge, and wherein the first flat edge is azimuthally offset from the second flat edge by approximately 180°.

9. A system comprising:
   a total station configured to be used for at least one surveying operation; and
   a surveying prism configured to be used for the at least one surveying operation, the surveying prism comprising:
      a housing defining at least a first end and a second end;
      a plurality of optical features located on a radial surface of the housing azimuthally offset from one another by equal arcs; and
      a bumper located on the first end of the housing and covering the plurality of optical features, wherein the bumper comprises:
         a plurality of flat edges located on a radial surface of the bumper, the plurality of flat edges corresponding to the plurality of optical features, wherein each flat edge of the plurality of flat edges has a different first center point of a plurality of first center points that is approximately at the same azimuthal angle with respect to the surveying prism as a corresponding second center point, included in a plurality of second center points of the plurality of optical features, of a corresponding optical feature of the plurality of optical features; and
         a plurality of position indicators corresponding to the plurality of optical features, wherein each position indicator of the plurality of position indicators is positioned at a central point of a different flat edge of the plurality of flat edges.

10. The system of claim 9, wherein the plurality of flat edges has a number of flat edges that is evenly divisible by four.

11. The system of claim 10, wherein the plurality of optical features comprises eight optical features, wherein each optical feature of the eight optical features is azimuthally offset from an adjacent optical feature of the eight optical features by approximately 45°.

12. The system of claim 9, wherein the plurality of optical features has a first number of optical features, wherein the plurality of flat edges has a second number of flat edges, wherein the plurality of position indicators has a third number of position indicators, and wherein the first number, the second number, and the third number are the same.

13. The system of claim 9, wherein the bumper has an approximately circular shape, and wherein each flat edge of the plurality of flat edges is a chord that extends from a first point on a radius of the circular shape to a second point on the radius of the circular shape.

14. The system of claim 9, wherein each first center point of the plurality of first center points is longitudinally offset from a corresponding second center point of the plurality of second center points along a longitudinal axis of the surveying prism.

15. The system of claim 9, wherein the plurality of optical features comprises one or more mirrors or lenses that are configured to reflect emitted light from the total station to facilitate precise measurements of location for the at least one surveying operation.

16. The system of claim 9, wherein the plurality of flat edges comprises an even number of edges, wherein the plurality of flat edges comprises at least one pair of flat edges having a first flat edge and a second flat edge, and wherein the first flat edge is azimuthally offset from the second flat edge by approximately 180°.

17. A method comprising:
positioning a surveying prism at a first location, wherein the surveying prism comprises:
- a housing defining at least a first end and a second end;
- a plurality of optical features located on a radial surface of the housing azimuthally offset from one another by equal arcs; and
- a bumper located on the first end of the housing and covering the plurality of optical features, wherein the bumper comprises:
  - a plurality of flat edges located on a radial surface of the bumper, the plurality of flat edges corresponding to the plurality of optical features, wherein each flat edge of the plurality of flat edges has a different first center point of a plurality of first center points that is approximately at the same azimuthal angle with respect to the surveying prism as a corresponding second center point, included in a plurality of second center points of the plurality of optical features, of a corresponding optical feature of the plurality of optical features; and
  - a plurality of position indicators corresponding to the plurality of optical features, wherein each position indicator of the plurality of position indicators is positioned at a central point of a different flat edge of the plurality of flat edges, wherein at least one flat edge of the plurality of flat edges is positioned against a surface;

positioning a total station offset from the surveying prism; and recording surveying data using the total station and the surveying prism.

18. The method of claim 17, wherein the plurality of optical features comprises eight optical features, wherein each optical feature of the eight optical features is azimuthally offset from an adjacent optical feature of the eight optical features by approximately 45°.

19. The method of claim 17, wherein the plurality of optical features has a first number of optical features, wherein the plurality of flat edges has a second number of flat edges, wherein the plurality of position indicators has a third number of position indicators, and wherein the first number, the second number, and the third number are the same.

20. The method of claim 17, wherein each first center point of the plurality of first center points is longitudinally offset from a corresponding second center point of the plurality of second center points along a longitudinal axis of the surveying prism.

* * * * *